(12) United States Patent
Carter et al.

(10) Patent No.: US 7,136,934 B2
(45) Date of Patent: Nov. 14, 2006

(54) MULTIMEDIA SYNCHRONIZATION METHOD AND DEVICE

(75) Inventors: Harry Nick Carter, Saratoga Springs, NY (US); Ronald Cococcia, Ridgefield, CT (US); Zachary Piech, Troy, NY (US); John Reine, Wellesley, MA (US); Silvan Sauter, Kronbuehl (CH); Steven Vasquez, Kings Park, NY (US); Craig Willis, Troy, NY (US); Hyung-Jun Brutus Youn, Troy, NY (US)

(73) Assignee: ReQuest, Inc., Ballston Spa, NY (US)

( * ) Notice: Subject to any disclaimer, the term of this patent is extended or adjusted under 35 U.S.C. 154(b) by 891 days.

(21) Appl. No.: 09/884,661

(22) Filed: Jun. 19, 2001

(65) Prior Publication Data

US 2002/0194309 A1    Dec. 19, 2002

(51) Int. Cl.
    *G06F 15/16*    (2006.01)
(52) U.S. Cl. ............... 709/248; 709/237; 725/135; 707/201
(58) Field of Classification Search ............... 709/248, 709/237; 707/201; 725/135
    See application file for complete search history.

(56) References Cited

U.S. PATENT DOCUMENTS

| 5,355,302 A | 10/1994 | Martin et al. |
| 5,557,541 A | 9/1996 | Schulhof et al. |
| 5,572,442 A | 11/1996 | Schulhof et al. |

(Continued)

FOREIGN PATENT DOCUMENTS

WO    WO 01/16804 A2    3/2001

(Continued)

OTHER PUBLICATIONS

"Novell iFolder Synchronizes Information Across the Net; Provides Reliable Anytime, Anywhere Access", press release, Mar. 19, 2001, at www.novell.com/news/press/archive/2001/03/pr01021.html.

*Primary Examiner*—Krisna Lim
(74) *Attorney, Agent, or Firm*—David W. Carstens; Carstens & Cahoon, LLP

(57) ABSTRACT

A system and method for synchronizing a multiplicity of devices in a multimedia environment is described. The system has at least one central storage and interface device, wherein audio, video, and photographic information including content information and content management information, relating to at least one user, are stored in digital form. The system further has a plurality of zones each having a zone specific storage and interface device being capable of storing or interfacing with information stored in the central storage and interface device, wherein audio, video, or photographic information, relating to at least one user, contained within each one of the plurality of zone specific storage and interface devices and the central storage and interface device, are updated in relation with other zone specific storage and interface devices and the central storage and interface device. This results in the at least one user can be situated at anyone of the zones and access substantially identical audio, video, and photographic information related to the at least one user. The method includes providing the plurality of devices, providing the plurality of zones, determining whether a current synchronization point exists, if a previous synchronization point exists, receiving information from a server, if a previous synchronization point does not exists, sending information to a at least one client by a host, wherein the at least one user is disposed to have control, determining what information is needed by the at least one client, and establishing the resultant state as a synchronization point.

15 Claims, 6 Drawing Sheets

U.S. PATENT DOCUMENTS

| | | |
|---|---|---|
| 5,661,787 A | 8/1997 | Pocock |
| 5,675,787 A | 10/1997 | Miller et al. |
| 5,721,815 A | 2/1998 | Ottesen et al. |
| 5,721,827 A | 2/1998 | Logan et al. |
| 5,726,909 A | 3/1998 | Krikorian |
| 5,729,735 A | 3/1998 | Meyering |
| 5,734,119 A | 3/1998 | France et al. |
| 5,742,820 A * | 4/1998 | Perlman et al. ............. 707/201 |
| 5,887,060 A | 3/1999 | Ronning |
| 5,914,941 A | 6/1999 | Janky |
| 5,926,624 A | 7/1999 | Katz et al. |
| 5,931,901 A | 8/1999 | Wolfe et al. |
| 5,953,005 A * | 9/1999 | Liu ........................ 715/500.1 |
| 5,969,283 A | 10/1999 | Looney et al. |
| 5,978,805 A | 11/1999 | Carson |
| 5,987,525 A | 11/1999 | Roberts et al. |
| 6,000,000 A | 12/1999 | Hawkins et al. |
| 6,055,566 A | 4/2000 | Kikinis |
| 6,084,168 A | 7/2000 | Sitrick |
| 6,154,773 A | 11/2000 | Roberts et al. |
| 6,161,132 A | 12/2000 | Roberts et al. |
| 6,161,142 A | 12/2000 | Wolfe et al. |
| 6,170,005 B1 | 1/2001 | Meandzija |
| 6,199,076 B1 | 3/2001 | Logan et al. |
| 6,212,555 B1 | 4/2001 | Brooks et al. |
| 6,230,207 B1 * | 5/2001 | Roberts et al. ............. 709/236 |
| 6,240,459 B1 * | 5/2001 | Roberts et al. ............. 703/232 |
| 6,330,593 B1 * | 12/2001 | Roberts et al. ............. 709/217 |
| 6,405,218 B1 * | 6/2002 | Boothby ..................... 707/201 |
| 6,657,646 B1 * | 12/2003 | Partridge et al. ........... 715/835 |
| 6,681,370 B1 * | 1/2004 | Gounares et al. ........... 715/513 |
| 6,715,126 B1 * | 3/2004 | Chang et al. ............ 715/500.1 |
| 6,778,493 B1 * | 8/2004 | Ishii ........................... 370/229 |
| 6,816,909 B1 * | 11/2004 | Chang et al. ............... 709/231 |
| 6,892,210 B1 * | 5/2005 | Erickson et al. ............ 707/201 |
| 6,904,185 B1 * | 6/2005 | Wilkins et al. ............. 382/311 |
| 2002/0004839 A1 * | 1/2002 | Wine et al. ................. 709/231 |
| 2002/0010789 A1 * | 1/2002 | Lord .......................... 709/231 |
| 2002/0019978 A1 * | 2/2002 | Terretta ....................... 725/34 |
| 2002/0065926 A1 * | 5/2002 | Hackney et al. ............ 709/231 |
| 2002/0111959 A1 * | 8/2002 | Ching et al. ................ 707/201 |
| 2002/0194309 A1 * | 12/2002 | Carter et al. ................ 709/219 |
| 2004/0133924 A1 * | 7/2004 | Wilkins et al. ............. 725/135 |

FOREIGN PATENT DOCUMENTS

WO    WO 02/077862 A1    10/2002

* cited by examiner

MULTIMEDIA SYNCHRONIZATION METHOD AND DEVICE

BACKGROUND OF THE INVENTION

This invention relates generally to the field of multimedia record and playback devices, and more particularly to such devices which incorporate digitally stored multimedia data on a stationary or removable memory and playback device which can convert the stored data into audible sound and visible video images.

Historically, radio and television have been the major audio and video content providers to the general population. Both radio and television provide the listener/viewer with a selection of programming directed at different preferences, and tastes. Unfortunately, listener/viewers have very little, if any, input into the broadcast formats selected by the radio stations and television networks. As such, the listener/viewer's optional programming choices are limited to the number and different formats played by local radio stations and national television networks.

Because of these and other limitations of music and video broadcasting, cassette players, compact disc (CD) players, video cassette recorders (VCR) and digital video disks (DVD) have become very popular. These devices allow the listener/viewer to select and control the type and frequency of music and video content they desire to listen to or watch at any given moment. However, several drawbacks to these devices include that the listener/viewer must individually purchase the cassette tapes, CDs, videotapes or DVDs which also have limited storage capacity. Likewise, the listener/viewer must transport a large number of cassettes, CDs, videotapes or DVDs to provide a range, of musical and video selections.

U.S. Pat. No. 6,161,132, entitled System For Synchronizing Playback Of Recordings And Display By Networked Computer Systems, discloses entertainment content complementary to a musical recording being delivered to a user's computer by means of a computer network link. The user employs a browser to access the computer network. A plug-in for the browser is able to control an audio CD or other device for playing the musical recording. A script stored on the remote computer accessed over the network is downloaded. The script synchronizes the delivery of the complementary entertainment content with the play of the musical recording. However, this patent does not teach transferring of information related to a particular user.

U.S. Pat. No. 5,355,302, entitled System For Managing A Plurality Of Computer Jukeboxes, discloses a method and apparatus for managing a plurality of computer jukeboxes at different locations from a central station. Each jukebox includes processor means for controlling the computer jukebox, storage and retrieval means for data, display means for selection menus, audio production means for playing musical records, and a user interface enabling patrons to communicate with the processor means. However, substantially identical information related to a particular user are not synchronized and stored in all the zones in this patent.

U.S. Pat. No. 6,055,566, entitled Customizable Media Player With Online/Offline Capabilities, discloses an information dissemination system comprises an Internet-connected server adapted for gathering information from plural sources, and sorting the information according to subscriber preferences. The sorted information is transmitted via the Internet to a subscriber's Internet Applicance (IA) as electronic documents, where the documents are downloaded to a connected playback device. However, this patent does not teach a local area network (LAN) for coupling a central storage and interface device with a zone specific storage and interface device.

U.S. Pat. No. 6,161,142, entitled Method And System For Using A Communication Network To Supply Targeted Streaming Advertising In Interactive Media, discloses a system and method for delivering programmed music and targeted advertising messages to Internet based subscribers includes a software controlled microprocessor based repository in which the dossiers of a plurality of the subscribers are stored and updated, musical content and related advertising are classified and matched. A subscriber has an appropriate microprocessor based device capable of selecting information and receiving information from the Internet. The subscriber receives the programmed music and matched advertisements from the repository over the Internet. However, this patent does not teach user specific synchronization, or LAN based communication network.

U.S. Pat. No. 6,199,076, entitled Audio Program Player Including A Dynamic Program Selection Controller, discloses an audio program and message distribution system in which a host system organizes and transmits program segments to client subscriber locations. The host organizes the program segments by subject matter and creates scheduled programming in accordance with preferences associated with each subscriber. Program segments are associated with descriptive subject matter segments, and the subject matter segments may be used to generate both text and audio cataloging presentations to enable the user to more easily identify and select desirable programming. However, this patent does not teach user specific information including substantially identical information at each zone wherein the user can access the information without any further communication between the zones. Similarly, U.S. Pat. No. 5,926,624, entitled Digital Information Library And Delivery System With Logic For Generating Files Targeted To The Playback Device, does not teach the same either.

U.S. Pat. No. 5,734,119, entitled Method For Streaming Transmission Of Compressed Music, discloses an Internet high fidelity audio transmission and compression protocol including a system for representing synthesized music in a relatively small file as compared to digital recording. The protocol includes a method for streaming the transmission of a music data file from a Server-Composer computer such that the music can begin being played back as soon as the file begins to arrive at a Client-Player computer. The system includes a graduated resolution improvement feature which allows the music to be recreated exactly as originally composed as the necessary wavetable data is downloading in the background and the music continues to play in the foreground. However, this patent does not teach using LAN as a means for transfer of information.

U.S. Pat. No. 5,721,815, entitled Media-On-Demand Communication System And Method Employing Direct Access Storage Device, discloses a method of transmission in discrete form between a vender and a user. However, this patent does not teach the user accessing substantially identical information at a plurality of zones. Similarly, U.S. Pat. No. 5,572,442, entitled System for Distributing Subscription and On-Demand Audio programming does not teach the same.

Therefore it is desirous to have a consumer digitally encode their entire audio, video, and photographic collections to be stored on multimedia storage devices, and have the entire collection synchronized automatically by having the devices communicate to and from each other so that the content is available in multiple locations or zones that the consumer may go. These may include devices such as personal computers located in other rooms or other locations (for example summer home, car, yacht, etc.), or on an online server/website/database. It is preferable to have the content locally stored so that interruptions and skips associated with streaming content over the network does not occur. Additionally, should the storage device such as a hard drive of one unit fails, then the other devices still have complete copies of the content collection to easily replace the failed unit.

In light of these considerations, it is an object of this invention to provide a multimedia player device and system which is capable of storing a relatively large amount of digital multimedia programming, whether audio or video, with relatively instant access to any piece of stored data for playback, where the stored data may be replaced with new data when the desires of the user change. It is a further object to provide such a device and system where the transfer of data to the multimedia player device is accomplished through alternative communication means, such that the user can choose from a vast array of data encompassing all formats of audio and video programming and can choose to synchronize the multimedia player device with other multimedia devices on a network for the upload and download of multimedia content from connected network devices.

SUMMARY OF THE INVENTION

The invention is an apparatus and system for providing recorded multimedia programming in digital form in a multimedia player device where the user chooses the particular programming so recorded, and further where the recorded programming is updated or replaced periodically with new content from different networked sources. The system comprises a device capable of digitally recording, storing, downloading and uploading multimedia programming in either audio or video formats and is able to transmit such digital data, either via a hardwired or wireless network, where the data is stored on a combination multimedia receiver/player/data storage device, hereafter referred to as a "digital multimedia device." The digital multimedia device comprises a readable/writable memory storage mechanism (e.g., disk drive, hard drive, memory) capable of receiving network transmissions, and a playback or player feature interfaced with a mobile or fixed radio receiver, television or personal computer.

The digital player device provides means to display alphanumeric information related to the data chosen to be played on the device itself or through a television or personal computer monitor connection. As data transmissions are received, the data files are stored in digital form within the storage unit as a buffer to be accessed by the playback mechanism, in effect, delaying the playback of the received data until the multimedia works are needed. The data is then converted to "real time" audio or video, utilizing a digital-to-analog converter in the case of audio files, and played back to the listener. As each file is played back, the user may choose to delete the file, and the storage device would then over-write or replace the file with a new file or files of similar size as downloaded by the user from other network resources. The user could also elect to skip the file and proceed to another file stored on the digital player device. As available memory allows, additional multimedia works will continue to be received and stored until the data storage device is filled to capacity, even as the user simultaneously listens to a previously received file. The digital multimedia device is designed to have a relatively large storage capacity, such that hundreds or thousand of files for example, could be stored on the device at any one time.

Another feature of the digital multimedia player provides, as new files are constantly being accessed through a network, such as the world wide web, tile data storage unit is refreshing the files stored on the digital multimedia device as old files are either deleted or updated by the user. Since the digital multimedia device is connected to the network, it has direct access to the network which allows the listener to request custom files between the listener and other digital player devices, personal computers and music source databases connected to the network.

The instant invention teaches a system and method for synchronizing a multiplicity of devices in a multimedia environment. The system has at least one central storage and interface device, wherein audio, video, and photographic information including content information and content management information, relating to at least one user, are stored in digital form. The system further has a plurality of zones each having a zone specific storage and interface device being capable of storing or interfacing with information stored in the central storage and interface device, wherein audio, video, or photographic information, relating to at least one user, contained within each one of the plurality of zone specific storage and interface devices and the central storage and interface device, are updated in relation with other zone specific storage and interface devices and the central storage and interface device. This results in the at least one user can be situated at anyone of the zones and access substantially identical audio, video, and photographic information related to the at least one user.

The method includes providing the plurality of devices, providing the plurality of zones, determining whether a current synchronization point exists, if a previous synchronization point exists, receiving information from a server, if a previous synchronization point does not exists, sending information to a at least one client by a host, wherein the at least one user is disposed to have control, determining what information is needed by the at least one client, and establishing the resultant state as a synchronization point.

DETAILED DESCRIPTION OF THE INVENTION

The invention will now be described in detail with regard to the best mode and the preferred embodiment. In general, the invention is a system and method comprising a digital multimedia player connected to a network and capable of transferring, receiving, storing, decoding and playing selected data files from plethora of devices connected to the network, including but not limited to, a computer server, a database, a personal computer and other multimedia receiver/player devices capable of transferring, receiving, storing, decoding and playing the data in an multimedia format.

Figure 1:
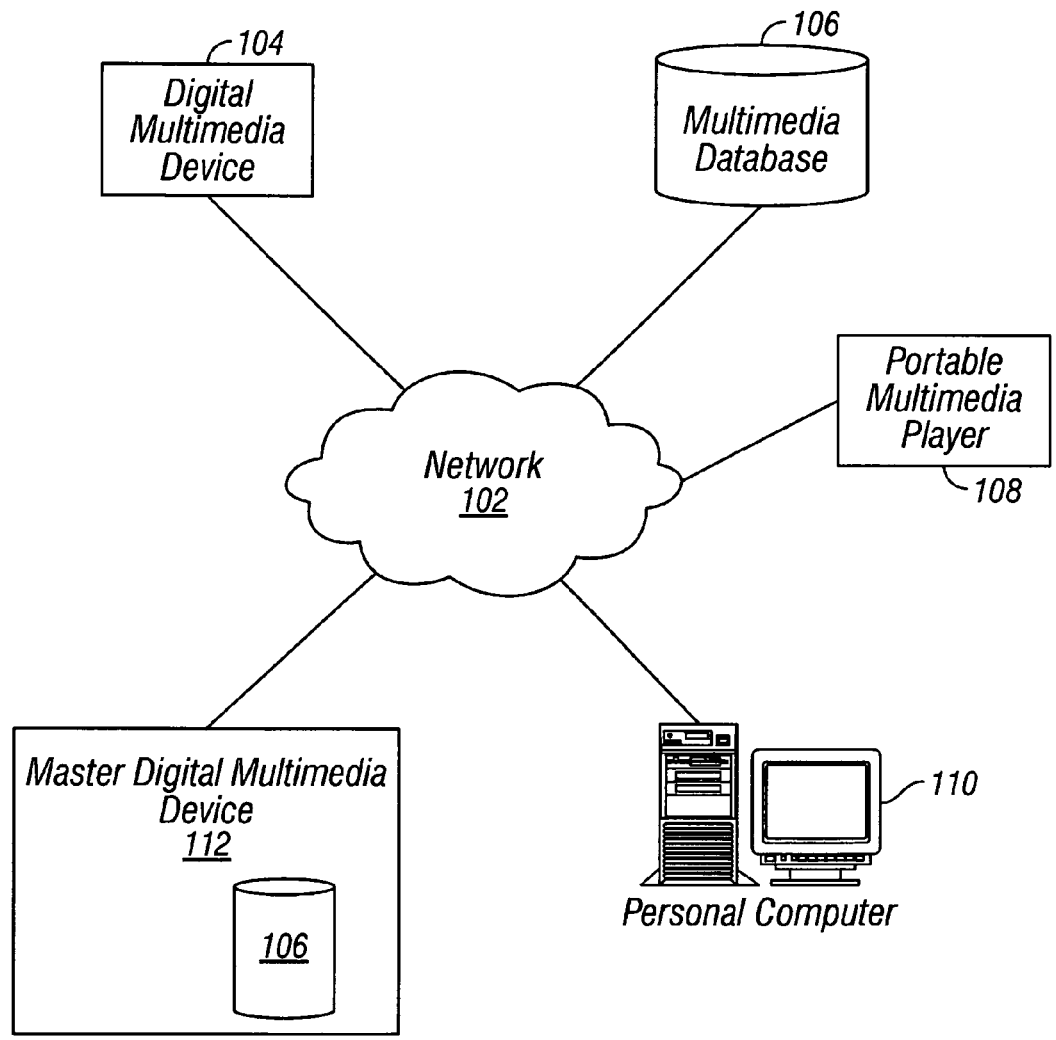
FIG. 1 is a network diagram with attached devices capable of storing and transmitting digital multimedia files.

With reference to FIG. 1, a digital multimedia device 104 is connected to network 102 along with a multimedia database 106. In addition, a portable multimedia player 108, a personal computer 110, and "master" digital multimedia player are connected to network 102. For purposes of this application, a personal computer is any computer, coupled to a network, which receives a program, data or other application from another data source or computer coupled to the network. In the depicted example, multimedia database 106 provides data, such as digital audio and video files in their respective formats, to digital multimedia device 104 and other devices attached to the network capable of receiving audio and video content. The data network system 102 may include additional servers, clients, digital multimedia players and other devices not shown.

The network 102 is capable of delivering data files between the network devices, such as multimedia database 106, personal computer 110, portable and fixed digital multimedia devices 104, 112. Muster digital multimedia device 112 can include a database such as the multimedia database 106. As can be appreciated the multimedia database 106 can be a stand-alone entity coupled to the network 102 as well. Furthermore, Muster digital multimedia device 112 has the capability to store video/audio products in digital form. Preferably, the network 102 comprises a transmission network capable of sending data via an extremely high data transfer rate system, and may comprise satellite, radio, microwave, cellular or other known wireless transmissions using terrestrial or satellite means. It is contemplated that such transfer of data could also be accomplished through direct physical connections (e.g., telephone lines). Network system 102 may be the Internet representing a worldwide collection of networks and gateways that use the TCP/IP suite of protocols to communicate with one another. Of course, network 102 also may be implemented as a number of different types of networks, such as for example, a wireless internet network, an intranet, a local area network (LAN), or a wide area network (WAN). FIG. 1 is intended as an example, and not as an architectural limitation for the present invention.

Multimedia database 106 is an online collection of audio and video works which may accessed by network devices on a subscription or free file share basis. The recorded multimedia works may be categorized as to format, such as classical, jazz, contemporary, classic rock, etc. and video works such as, educational, drama, comedy, etc. The digital source database translates and stores the audio and video works in digital form, with the works subdivided into different formats. The content source database is further capable of communication with other network devices to deliver the data stored in the database to a digital player device, personal computer or microprocessor, or portable personal digital player.

Figure 2:
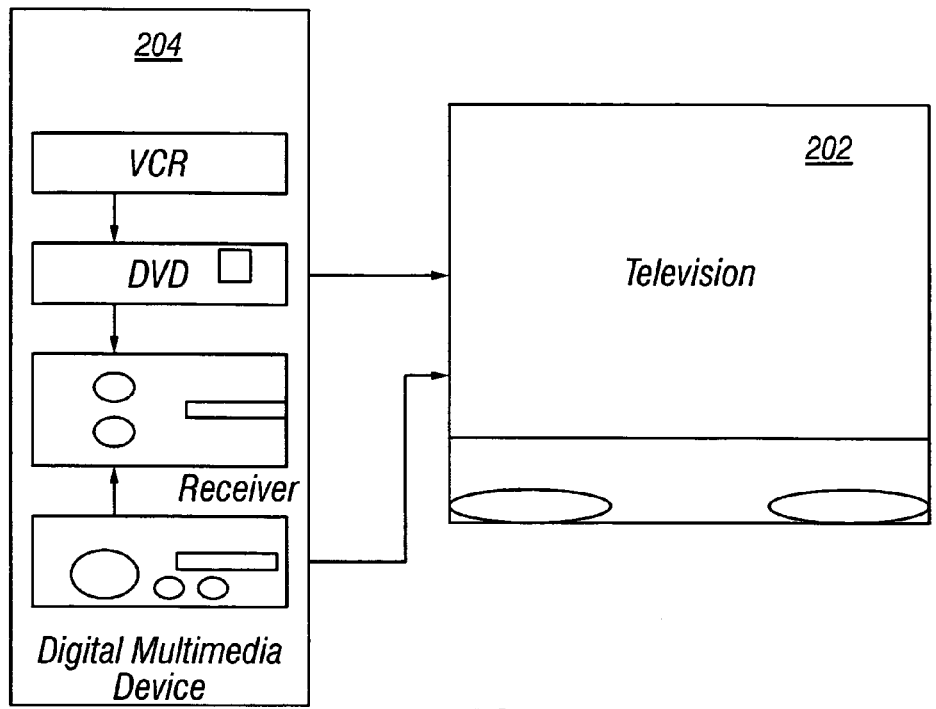
FIG. 2 is a diagram of the multimedia device shown connected to a user's home audio/video system.

With regard to FIG. 2, the digital multimedia device 104 is a powered electronic device designed to be a stand-alone unit for use in the home or office and powered conventionally by electricity, or a unit installed in an automobile in a manner similar to standard cassette, CD, DVD players. FIG. 2 is a diagram showing one example of the digital multimedia device attached to a user's home audio/video system with a menu display on the user's television. The depicted arrangement allows the user to operate the digital multimedia device's playback functions by utilizing a televised menu driven hierarchy providing the user with program selection choices. As well, the user may program the digital multimedia device's download, synchronization and storage functions via the menu driven interface or alternatively keypad on the digital multimedia device.

Figure 3:
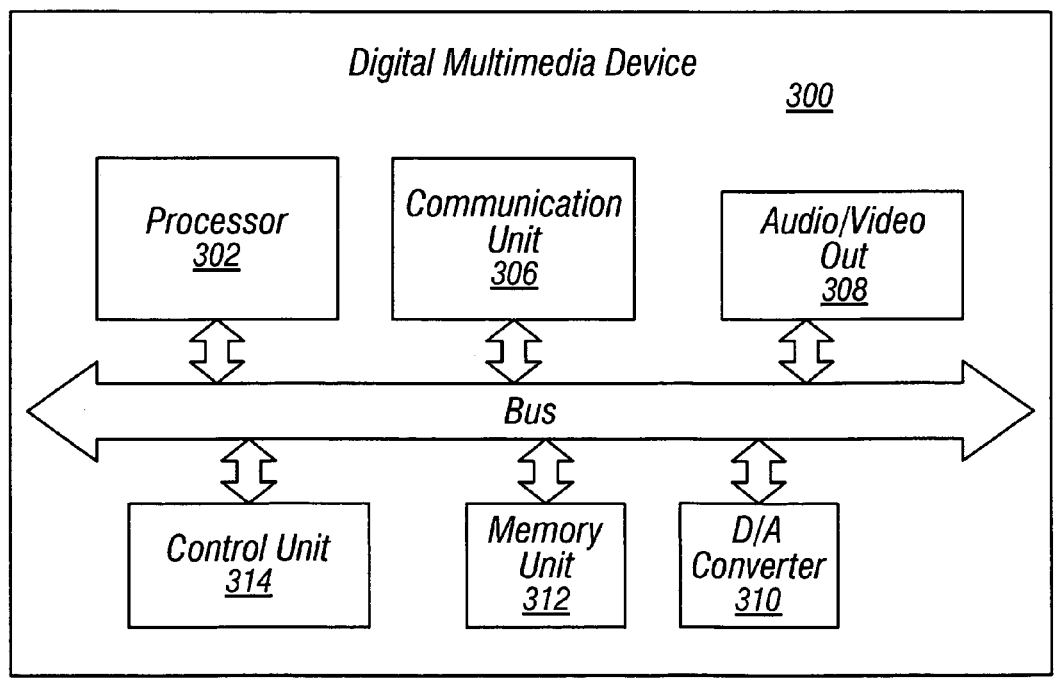
FIG. 3 is a diagram of a typical digital multimedia device connected to the user's home audio/video system.

FIG. 3 depicts key internal components providing for the operation of the invention disclosed herein. The digital multimedia device 104 comprises a microprocessor 302, a network communication unit 306, an audio video output 308, a digital to analog converter (D/A unit) 310 which decodes and converts digitized data to an analog signal output, memory unit 312, preferably consisting of a disk drive, hard drive, memory or flash card system capable of storing a large amount of multimedia programming in digital format in individual files, but with a readable/writable storage mechanism that will replace or write over the old data file with one or more new ones, until the data storage device is fully loaded. The data memory unit 312 means of the digital multimedia device 104 could be removable or detachable for transport or even interchangeable with other audio/video player devices. The control unit 314 provides means to select and play any particular multimedia work relatively instantaneously which includes keys and commands for start, stop, skip, repeat, shuffle and save keypad buttons, and a visual display means to display alphanumeric information about the work selected. The invention may also be packaged with a standard AM/FM radio, cassette player or compact disc player, such that the listener has other options for digital audio/video recording and audio/video output.

Figure 4:
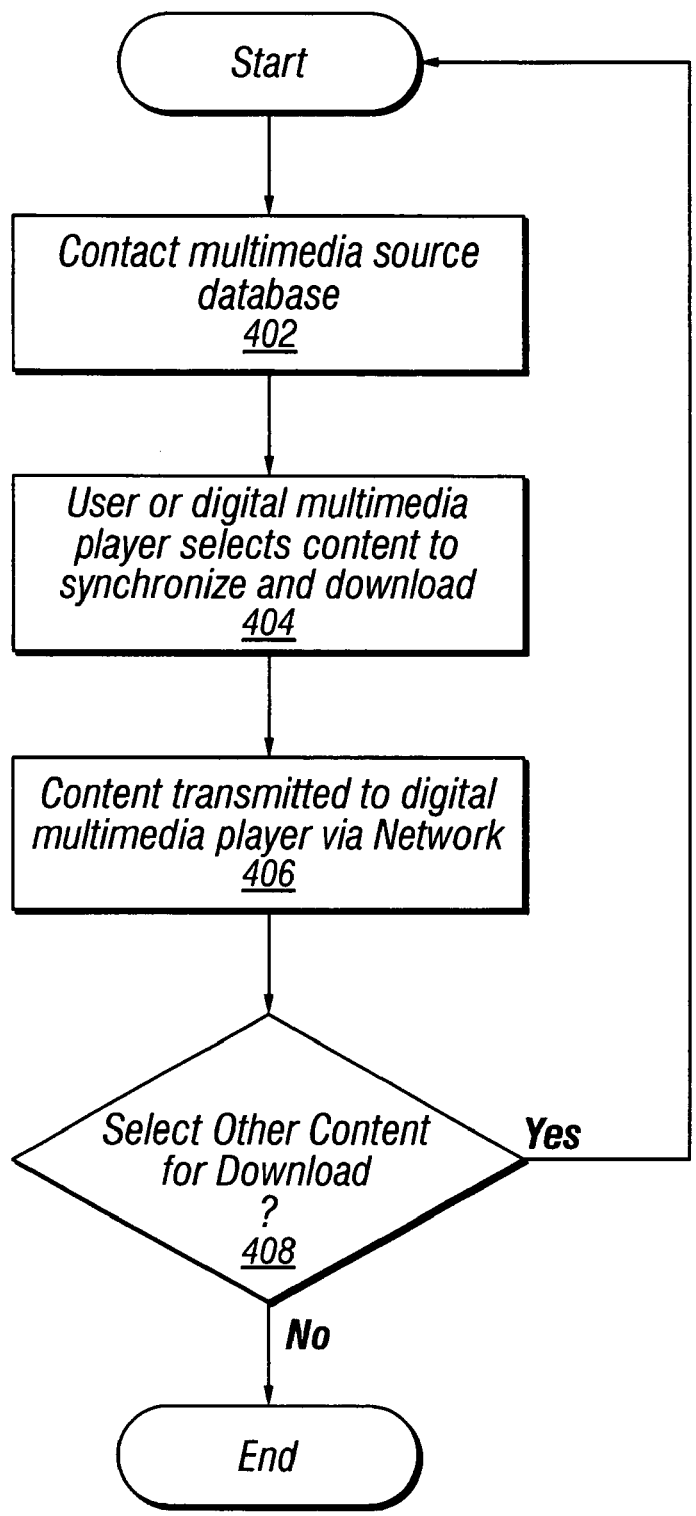
FIG. 4 is a flow chart illustrating the procedure for downloading digital content from a content database.

FIG. 4 is a flowchart depicting one embodiment of the present invention. The digital multimedia device 104 allows the user, via the control unit 314 means, to request and download entirely new recorded data into the digital multimedia device 104 or program the digital multimedia device 104 to synchronize and update the user's audio/video files automatically from a multimedia database 106, a personal computer or other devices connected to the network. For example, the user instructs the digital multimedia device to establish network contact with a selected multimedia database in the required communicating manner(Step 402). The user then selects the desired multimedia works to be synchronized and downloaded for storage on the digital multimedia device from the music multimedia database(Step 404). The selected digital data is downloaded from the music multimedia database into the data storage memory unit of the digital multimedia device(Step 406). The user may then be prompted to select other content for download. If the user desires to download more content, the process is repeated (Step 408). If the user declines to download or update content, the session is terminated. As a result, the user may listen to entirely different audio/video selections from those previously recorded in the digital multimedia device.

Figure 5:
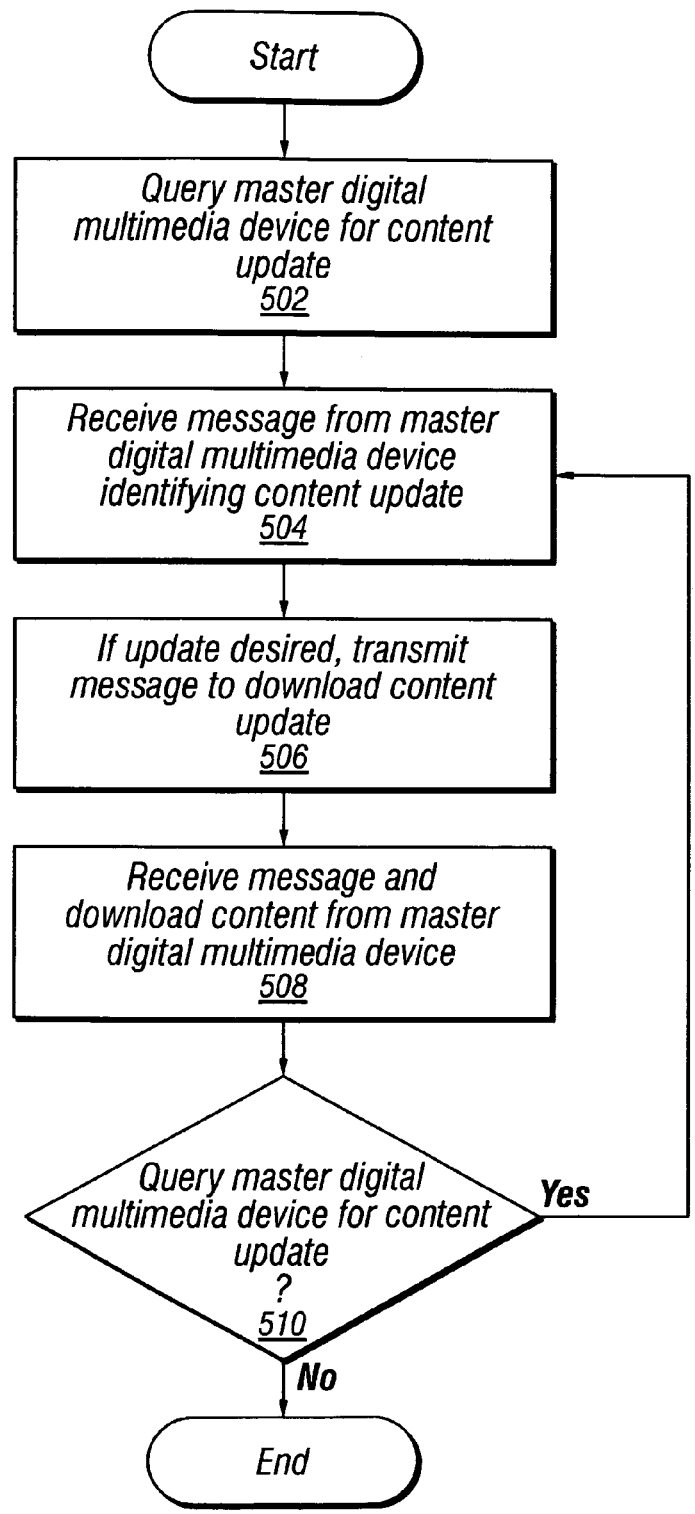
FIG. 5 is a flow chart representing the method for synchronizing and downloading multimedia content and updates from the master to subordinate digital multimedia devices connected to the network.

Turning to FIG. 5, an alternative embodiment of the present invention is discussed in further detail wherein the digital multimedia player 104 automatically performs the synchronization and download function between "master" and "subordinate" digital multimedia devices 104,112. The subordinate digital multimedia device establishes network contact with a selected master digital multimedia device in the required communicating manner. The subordinate digital multimedia device then queries the master multimedia device to determine if content downloads or updates are available(Step 502). The master digital multimedia device responds to the query(Step 504). If content updates or downloads are available, the subordinate digital player device initiates the synchronization and download of the appropriate files(Step 506) and the digital data is placed in the data storage memory unit of the subordinate digital multimedia device(Step 508). After download is complete and at various selectable intervals, the subordinate digital multimedia player may then again query the master digital multimedia device for available content downloads or updates(Step 510) and the process is again repeated. It should be noted that the user may access and play stored audio content with the digital multimedia player while the update synchronization functions are being performed and that the process may be initiated by the master digital multimedia device as opposed to the subordinate multimedia device. Likewise, subordinate multimedia devices may synchronize with other designated master multimedia devices such as a personal computer, a source database or other networked storage service or devices, and receive download updates or multimedia files as set forth in this specification.

Figure 6:
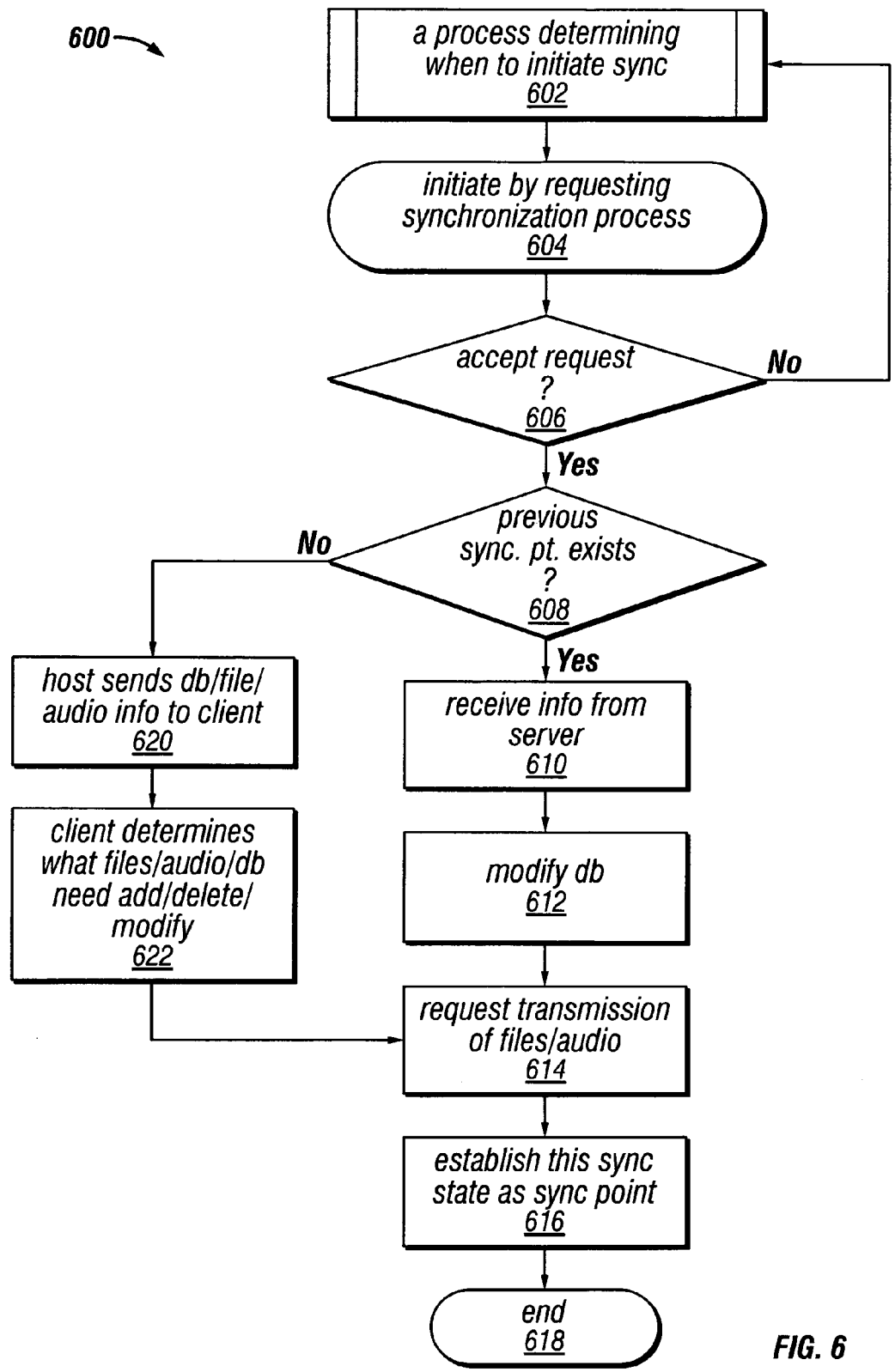
FIG. 6 is a flowchart depicting a synchronization of the instant invention.

Referring now to FIG. 6, a flowchart 600 depicting a synchronization of the instant invention is described. A process(Step 602) determines when to initiate the synchronization. Once a decision is made to initiate synchronization, a request is made and the depicted synchronization process starts(Step 604). A first determination is made in that if the request is rejected, the process reverts back to step 602 to wait for another initiation as to when to start the synchronization process(Step 606). If the request is accepted, the flowchart 600 progresses onward. A second determination (Step 608) is made in that if a previous synchronization point, or well established point exists, the synchronization process progresses to receive information from a server(Step 610). The received information from the server includes files containing audio and video entries. As can be appreciated, the instant invention teaches a set of zones wherein any zone has a zone specific device that contains all the audio and video, as well as text information which a user needs. If the information is not contained within the zone specific device, it is synchronized and made to contain the information. Therefore, if the device already has the information the user needs, an indication of the information may be transferred instead of the whole information, since the whole information is already in the device albeit not specifically used by a particular user. Continuing describing step 610, information may be received from the server regarding files on audio and video information from a database associated with the server. The information may include coded addition, deletion, or modification instructions for a specific device in a zone(Step 612). In other words, the database includes time sensitive information related to devices residing in different zones. For example, the user may change her preference in a particular zone at some recent time. This change is going to be noticed by the server, which stores related information in the database. A request for transmission of audio, video, or textual files is generated whereby each zone specific device is going to eventually be comprised of information specified by the user(Step 614). As can be appreciated, the information is the most recent information the user wants it to be. As a result, a new synchronization point is achieved. This synchronization resulted in establishing the most recent well-established synchronization point(Step 616). The synchronization process terminates(Step 618).

Referring back to step 608, if no previous synchronization exists, a host sends all the necessary information to at least one client, which comprises the relevant devices in each zone respectively(Step 620). The host can be any device in a zone capable of communicating information to other devices residing in different zones. This usually occurs during the initial or setup period wherein different zone devices have not set themselves up for the user specific information. Or this may occur when substantial change in regard to user preference is initiated. By way of example, change preference from country music to rock-n-roll. Client then determines what information is needed and in turn requests and receives the needed information. As can be appreciated, the needed information comprises audio, video and other graphic and textual files, or segment of files, or indexing information related to the above(Step 622). Thereupon, the logic progresses toward step 614.

As can be appreciated, a change or alteration that triggers the synchronization process includes adding or deleting songs, adding or deleting playlists, editing song or playlist information, and changing system settings and preferences. It is noted that this triggering occurs when any device in any particular zone is being altered.

Figure 7:
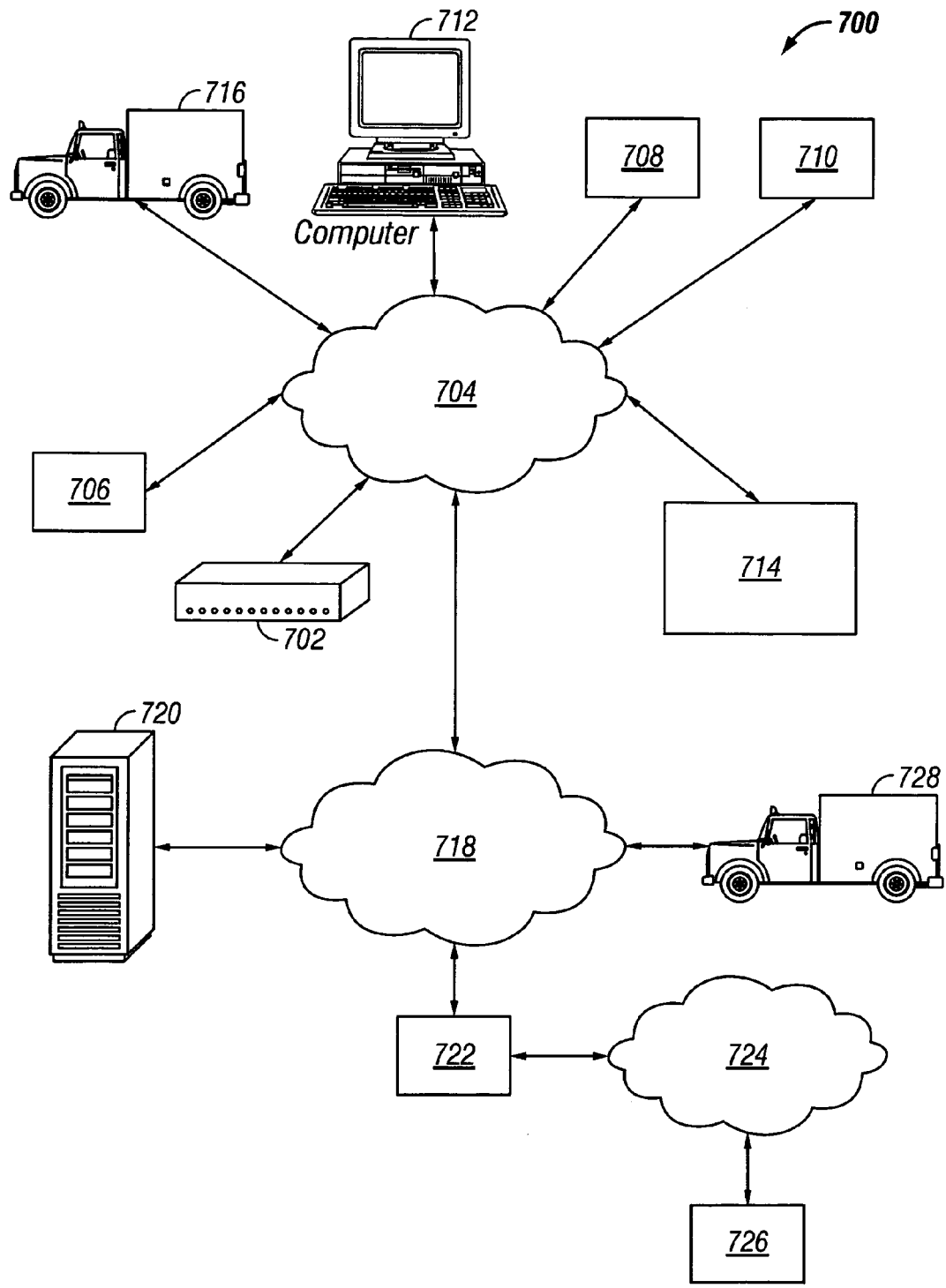
FIG. 7 is a block diagram depicting an embodiment of the instant invention.

Referring now to FIG. 7, a block diagram 700 of an embodiment of the instant invention is depicted. A central storage and interface device 702, which can be a AudioReQuest Pro, produced by ReQuest, Inc. is shown. It is noted that AudioReQuest is a trademark of ReQuest, Inc. A local area network (LAN) 704 couples central storage and interface device 702 to zone specific storage and interface devices 706, 708, and 710, each of which resides in a specific zone (not shown). A personal computer 712 is coupled to LAN 704 as well. In addition, other device 714 such as an intelligent MP3 player is coupled to LAN 704 as well. An automobile 716 that has AudioReQuest capabilities is also coupled to LAN 704. It is noted that LAN 704 can be based on Ethernet or can be landline or wireless such as IEEE 802.11 radio frequency or other suitable standard.

A wide area network (WAN) 718 such as the Internet couples together a server 720 such as an on-line server, and a second central storage and interface device 722, which in turn can be coupled to a second LAN 724 having at least one zone specific storage and interface device 726 coupled thereto. A second automobile 728 is coupled to WAN 718 as well. As can be appreciated, this coupling can be via direct wireless Internet connections, or a cellular connection.

A practical example of implementing the instant invention is described infra. In the example, central storage and interface device 702 is AudioReQuest Pro, zone specific storage and interface devices 706, 708, 710 are a set of AudioReQuest Multizone which is produced by ReQuest, Inc.

AudioReQuest Pro (ARQ Pro) is a central storage device that digitally records music from CDs using its built-in CD player. In addition, it can record From analog sources such as radio, Long Playing records (LPs), and audio cassettes through its line-in recording capability. Further, it can record and transfer digital music from the PC and internet sites. Playlists are created on the system by having a specific user who categorizes song choices for current or later playing. Song and Music Navigation information can be viewed on the built-in LCD, a television interface, or on other devices such as home automation control systems and personal computers through serial and Ethernet connections. Music can be either transferred or streamed to other devices 714 such as digital portable players, streaming network devices, web browsers, personal computers, online websites and servers, and other ReQuest products through network and universal serial bus (USB) connections.

AudioReQuest Multizone (ARQ Multi) is an accessory product that has the same storage, playback, and interface as the AudioReQuest Pro. It is noted that the substantial similarity between the AudioReQuest Pro and the AudioReQuest Multizone is achieved by synchronizing of AudioReQuest Pro with AudioReQuest Pro over a network, which may be network 704, 718, 724, or a combination of some or all of them. As can be appreciated, synchronization includes having devices in different zones store substantially identical content of entered music and playlists by a specific user. Different synchronizing schemes are possible (automatic, daily, weekly, etc). It is noted that users can synchronize or make the update on a demand. The ARQ Zone uses an Ethernet connection to a main unit for the synchronization of the music. As can be appreciated, online server 720 includes any main unit such as ARQ pro 702. Any number of ARQ Multizones can work with each ARQ Pro, allowing multiple outputs of the same music collection to be available. In a typical custom home installation, there may be upwards of 20 zones (e.g., rooms) with independent control and output. By way of example, instead of only playing one CD throughout the building, different songs can be played at the same time.

The AudioReQuest Pro and ARQ Multizone will have removable hard drives. This is desirous since if any one unit fails, a hard drive from another unit can be inserted and automatically work since they are synchronized such that the content of the hard drives are substantially the same. When an old hard drive is replaced with a new one, it will automatically synchronize and get the entire collection from the ARQ Pro. As can be appreciated, this system provides complete backup redundancy for the entire system, protecting the user's multimedia investment.

It is noted that ARQ Multi comprises interfaces for television display, for audio amplification, as well as for infrared connections.

Two AudioReQuest Pros can synchronize over the Internet, so that if a customer has their main home in Maine and a second home in Hawaii, both locations will have the same music collection available. Should a new CD be loaded in Hawaii, it will become available in Maine after it synchronizes, and vice versa. In addition, car and other mobile devices can also synchronize over wired or wireless connections. Furthermore, an online file server which exists either through a proprietary system or a public service, can be used to synchronize their music collections from their Pro, so that music can be streamed to their web browser, wireless cell phone, or other devices, anywhere on the Internet.

It is noted that the above listed devices such as zone specific storage and interface devices 706, 708, 710, or PC 712 can be located in separate zones respectively. Or, some can co-exist in a zone. One of the purpose of the zone is to give a user substantially exclusive or reclusive enjoyment of information shared by zone specific storage and interface devices 706, 708, 710, as well as by central storage and interface device 702, and other devices.

As can be appreciated, this invention teaches a complete system for providing recorded multimedia programming in digital form that is updated on all devices owned by an user, over a network. The main device digitally records, stores, plays, downloads, and uploads multimedia programming in audio, video, or picture format or other suitable formats (analog or digital). Furthermore, the main device is able to transmit such data, either via a hardwired or wireless network, to other devices that are capable of playing, storing, download and upload such data. The system allows multiple devices to synchronize its internal collection with each other, so that the end result is that all the devices have the same content and content management means (playlists, settings, etc.). Also devices having accessory playback only feature would synchronize the data, content, and content management with the main recorder device. Therefore, a complete copy of the content is stored locally in a device within a zone or any zone, so that the output can be played in multiple zones or rooms in a networked building or in multiple locations traveling through a wide area network such as the Internet. The instant invention also contemplates other device for mobile applications such as car, boat, airplane, and other transportation, that would synchronize through either hardwired or wireless means resulting in storing the content locally. The instant invention further contemplates a set of digital multimedia devices comprises a readable/writable memory storage mechanism (e.g. disk drive, hard drive, memory) which are capable of transmitting and/or receiving network transmissions, and a playback or player feature interfaced with a mobile or fixed radio receiver, television, or personal computer.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of steps without departing from the spirit of the invention. Accordingly, the present invention is intended to encompass such rearrangements, modifications, and substitutions of steps as fall within the scope of the appended claims.

We claim:

1. A system for synchronizing a multiplicity of devices in a multimedia environment, comprising:
at least one central storage and interface device, wherein audio, video, and photographic information including content information and content management information, relating to at least one user, are stored in digital form; and
a plurality of zones each having a zone specific storage and interface device being capable of storing or interfacing with information stored in the central storage and interface device, wherein audio, video, or photographic information, relating to at least one user, contained within each one of the plurality of zone specific storage and interface devices and the central storage and interface device, are updated in relation with other zone specific storage and interface devices and the central storage and interface device, whereby the at least one user can be situated at anyone of the zones and access substantially identical audio, video, and photographic information related to the at least one user.

2. The system of claim 1, further comprising a local area network (LAN) coupled to at least one zone specific storage and interface device with the central storage and interface device, wherein the interconnections within the LAN is hardwired or wireless.

3. The system of claim 1, further comprising a wide area network (WAN) coupling at least one zone specific storage and interface device with the central storage and interface device.

4. The system of claim 1, further comprising a set of zone specific output devices coupled to each of the zone specific storage and interface device, wherein audio, video, and photographic information is outputted, thereby the at least one user is disposed to have substantially identical contentinformation and content management information displayed and manipulated in anyone of the zones.

5. The system of claim 1, further comprising an output device coupled to the at least one central storage and interface device, wherein audio, video, and photographic information is outputted.

6. The system of claim 1, further comprising a server, wherein audio, video, and photographic information contained within each one of the plurality of zone specific storage and interface devices and the central storage and interface device are stored therein and updated at a predetermined time in relation with other zone specific storage and interface devices as well as the central storage and interface device, coupled to the WAN.

7. The system of claim 1, further comprising an other device coupled to the central storage and interface device via a network connection other than the LAN or WAN.

8. The system of claim 1, wherein the at least one user pre-stores the audio, video, and photographic information by way of using a device comprising the central storage and interface device, and the zone specific storage and interface device.

9. The system of claim 1, wherein the central storage and interface device comprises means for transmitting or receiving information to or from the zone specific storage and interface device.

10. The system of claim 1, wherein the zone specific storage and interface device comprises means for transmitting or receiving information to or from the central storage and interface device.

11. The system of claim 1, wherein the central storage and interface device is capable of converting analog information into digital form.

12. The system of claim 1, wherein the zone specific storage and interface device is disposed to be coupled to a personal computer (PC).

13. The system of claim 1, wherein the zone specific storage and interface device is disposed to be coupled to a wireless mobile device.

14. The system of claim 1, wherein the central storage and interface device is disposed to be coupled to a wireless mobile device via LAN.

15. The system of claim 1, wherein the central storage and interface device is disposed to be coupled to a wireless mobile device via WAN.

* * * * *